Oct. 23, 1928.
C. M. EVELETH
1,688,458
WEATHER STRIP
Filed Dec. 1, 1927
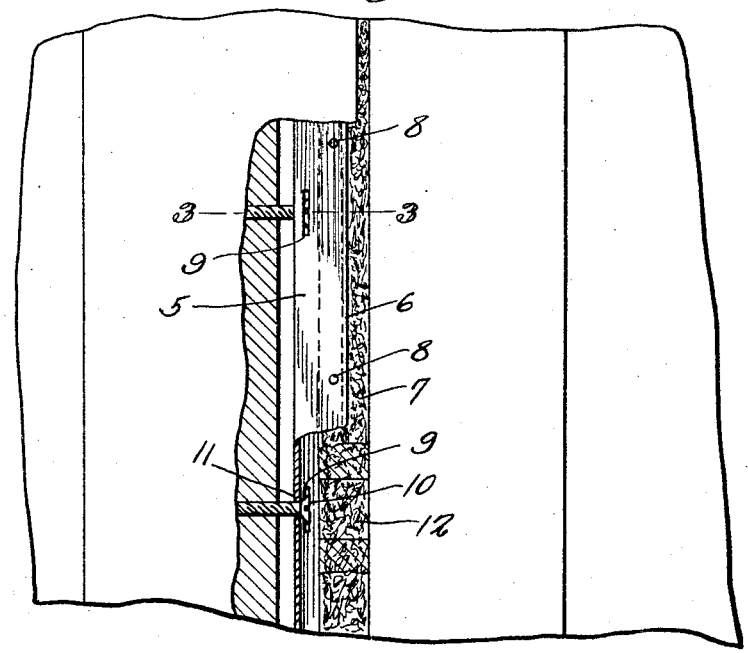
Fig. 1.
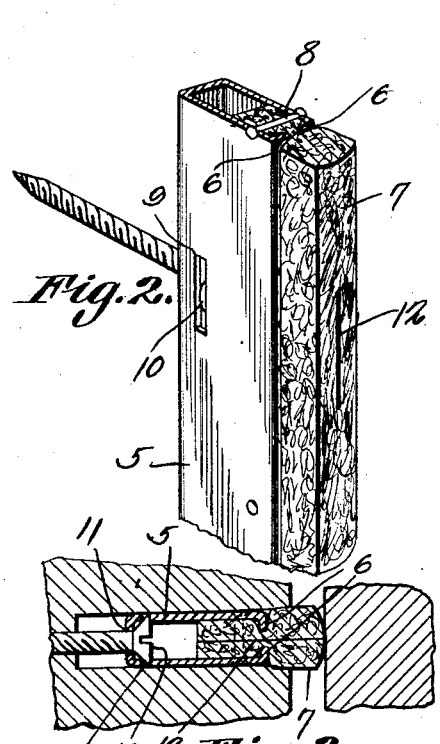
Fig. 2.
Fig. 3.
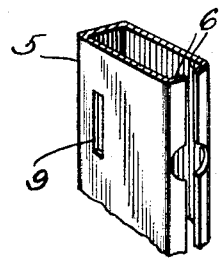
Fig. 4.
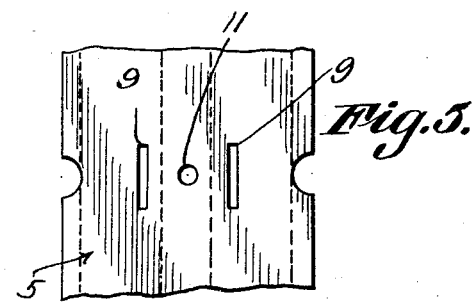
Fig. 5.
C. M. Eveleth
Inventor
By C. A. Snow & Co.
Attorneys.

Patented Oct. 23, 1928.

1,688,458

UNITED STATES PATENT OFFICE.

CLARENCE M. EVELETH, OF RIVER FOREST, ILLINOIS.

WEATHER STRIP.

Application filed December 1, 1927. Serial No. 237,072.

This invention relates to weather strip construction and aims to provide novel means whereby a weather strip may be securely held in position, but may be readily and easily adjusted so that the weather strip will contact with the movable element with which it is associated, without binding.

An object of the invention is to provide a weather strip of this character including a metallic member in which the felt packing is held, there being provided adjusting screws secured to the metallic member in a manner to permit of rotary movement of the adjusting screws.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view illustrating a weather strip constructed in accordance with the invention as positioned within a door casing.

Fig. 2 is a fragmental perspective view of the weather strip.

Figure 3 is a sectional view taken on line 3—3 of Figure 1.

Figure 4 is a fragmental perspective view of the metallic member that supports the felt packing strip.

Figure 5 is a fragmental elevational view of the metallic member prior to its being bent to its normal or supporting position.

Referring to the drawing in detail, the device forming the subject matter of the invention includes a metallic member 5 formed preferably of sheet metal and bent to provide inwardly extended flanges 6 disposed in spaced relation with each other to accommodate the felt packing strip 7, the sides of the metallic member being held in proper spaced relation with each other by means of the rivets 8.

As shown by Figure 5, elongated openings 9 are provided in the body portion of the metallic member and are designed to accommodate the heads 10 of the adjusting screws which secure the metallic members within a stile of a door. These adjusting screws also pass through openings 11 of the metallic member when the sides of the metallic member are moved upwardly so that the heads of the adjusting screws pass through the elongated openings 9 where the screws are held against movement.

Portions of the flanges 6 are cut away at points directly opposite the elongated openings 8 so that a small screw driver may be inserted to engage the adjusting screws for moving the metallic member with respect to the door stile in which the weather strip is positioned.

The felt strip 7 is formed with slits 12 that are disposed opposite to the heads of the adjusting screws so that a screw driver may be positioned therein to engage the adjusting screws to move the weather strip towards or away from the movable element with which it is associated.

Thus it will be seen that due to this construction an adjustment of the weather strip may be accurately made without danger of the weather strip binding with the movable element to retard the operation of the movable element.

It might be further stated that due to this construction the heads of the adjusting screws are securely held to the weather strip in such a way as to permit of rotary movement of the adjusting screws, but at the same time preventing the adjusting screws from moving through the metallic member independently of the metallic member.

I claim:

1. A weather strip including a metallic body portion, having spaced side members formed with elongated openings, screws extending through the body portion, the heads of said screws being positioned within the elongated openings, to secure the screws to the body portion, to permit of rotary movement of the screws, and a felt strip secured to the body portion.

2. A weather strip including a metallic body portion, having side members formed with inwardly extended flanges, a felt strip held between the flanges, said side members having elongated openings, said body portion having an opening adjacent to the elongated openings to receive a screw, the head of the screw being held within the elongated openings to permit of rotary movement of the screw, said flanges having cut out portions to accommodate portions of the felt packing strip, and said felt packing strip having slits adjacent to the cut out portion of the flanges to receive a tool to rotate the screw.

In testimony that I claim the foregoing as my own I have hereto affixed my signature.

CLARENCE M. EVELETH.